US007165732B2

(12) United States Patent
Kosmyna et al.

(10) Patent No.: US 7,165,732 B2
(45) Date of Patent: Jan. 23, 2007

(54) ADAPTER ASSEMBLY FOR A FLUID SUPPLY ASSEMBLY

(75) Inventors: Michael J. Kosmyna, Toledo, OH (US); Ralph A. Wisniewski, Toledo, OH (US)

(73) Assignee: Illinois Tool Works Inc., Glenview, IL (US)

( * ) Notice: Subject to any disclaimer, the term of this patent is extended or adjusted under 35 U.S.C. 154(b) by 297 days.

(21) Appl. No.: 10/760,079

(22) Filed: Jan. 16, 2004

(65) Prior Publication Data

US 2005/0156058 A1 Jul. 21, 2005

(51) Int. Cl.
*B05B 7/30* (2006.01)
*F16L 13/00* (2006.01)

(52) U.S. Cl. ...................... 239/346; 239/345; 239/328; 239/375; 239/600; 222/386.5; 222/479; 222/482; 222/541.1; 285/281; 285/396; 285/361

(58) Field of Classification Search ................ 239/302, 239/320, 323, 328, DIG. 14, 310, 315, 345, 239/346, 369, 375, 376, 377, 378, 379, 600; 222/183, 386.5, 105, 541.1; 285/190, 281, 285/396, 361
See application file for complete search history.

(56) References Cited

U.S. PATENT DOCUMENTS

| | | | |
|---|---|---|---|
| 856,361 A | 6/1907 | Neiburg | |
| 996,956 A * | 7/1911 | Walcott | 137/367 |
| 1,476,668 A | 12/1923 | Agnew, Sr. | |
| 1,703,384 A | 2/1929 | Birkenmaier | |
| 1,722,101 A | 7/1929 | Little | |
| 2,111,859 A * | 3/1938 | Kennedy | 285/85 |
| 2,263,843 A | 11/1941 | Gross | |
| 2,612,404 A | 9/1952 | Anderson | |
| 2,770,706 A | 11/1956 | Vogtle et al. | |
| 3,236,459 A | 2/1966 | McRitchie | |
| 3,255,972 A | 6/1966 | Hultgren et al. | |
| 3,401,842 A | 9/1968 | Morrison | |
| 3,432,104 A | 3/1969 | Kaltenbach | |
| 3,554,450 A | 1/1971 | D'Muhala | |
| 3,672,645 A | 6/1972 | Terrels et al. | |
| 3,776,408 A | 12/1973 | Wald | |
| 3,780,950 A | 12/1973 | Brennan | |

(Continued)

FOREIGN PATENT DOCUMENTS

EP 0 987 060 A1 3/2000

(Continued)

OTHER PUBLICATIONS

Anti-Static and Conductive Plastics, ESD Materials Categories, 2004, Boedeker Plastics, Inc., Shiner, Texas.

(Continued)

*Primary Examiner*—David A. Scherbel
*Assistant Examiner*—James S. Hogan
(74) *Attorney, Agent, or Firm*—Dinsmore & Shohl LLP

(57) ABSTRACT

An adapter assembly for connecting a fluid supply assembly to a fluid applicator. The adapter assembly includes an outer lid for the fluid supply assembly and an adapter. The adapter assembly provides a connection between the fluid supply assembly and the fluid applicator that can be engaged quickly, easily, and securely, and which has a strong tight seal around the connection.

26 Claims, 10 Drawing Sheets

U.S. PATENT DOCUMENTS

| | | | | |
|---|---|---|---|---|
| 3,892,306 | A | | 7/1975 | Sehlottmann |
| 3,940,052 | A | | 2/1976 | McHugh |
| 4,043,510 | A | | 8/1977 | Morris |
| 4,122,973 | A | | 10/1978 | Ahern |
| 4,140,279 | A | | 2/1979 | Hawkins |
| 4,151,929 | A | | 5/1979 | Sapien |
| 4,159,081 | A | | 6/1979 | Demler et al. |
| 4,298,134 | A | | 11/1981 | Lewis, Jr. |
| 4,356,930 | A | | 11/1982 | Roper |
| 4,383,635 | A | | 5/1983 | Yotoriyama |
| 4,388,997 | A | | 6/1983 | Grime |
| 4,405,088 | A | | 9/1983 | Gray |
| 4,433,812 | A | | 2/1984 | Grime |
| 4,634,003 | A | | 1/1987 | Ueda et al. |
| 4,760,962 | A | | 8/1988 | Wheeler |
| 4,773,569 | A | | 9/1988 | Larsson |
| 4,805,799 | A | | 2/1989 | Robbins, III |
| 4,811,904 | A | | 3/1989 | Ihmels et al. |
| 4,909,409 | A | * | 3/1990 | Shreve ........................ 220/374 |
| 4,930,644 | A | | 6/1990 | Robbins, III |
| 4,936,511 | A | | 6/1990 | Johnson et al. |
| 4,946,075 | A | | 8/1990 | Lundback |
| 4,951,875 | A | | 8/1990 | Devey |
| 4,971,251 | A | | 11/1990 | Dobrick et al. |
| 5,035,339 | A | | 7/1991 | Meyersburg |
| 5,059,319 | A | | 10/1991 | Welsh |
| 5,060,816 | A | | 10/1991 | Robbins, III |
| 5,067,518 | A | | 11/1991 | Kosmyna |
| 5,069,389 | A | * | 12/1991 | Bitsakos ..................... 239/289 |
| 5,143,294 | A | | 9/1992 | Lintvedt |
| 5,209,365 | A | | 5/1993 | Wood |
| 5,271,683 | A | | 12/1993 | Snetting et al. |
| 5,468,383 | A | | 11/1995 | McKenzie |
| 5,553,748 | A | | 9/1996 | Battle |
| 5,569,377 | A | | 10/1996 | Hashimoto |
| 5,582,350 | A | | 12/1996 | Kosmyna et al. |
| 5,601,212 | A | | 2/1997 | Lee |
| 5,655,714 | A | | 8/1997 | Kieffer et al. |
| 5,713,519 | A | | 2/1998 | Sandison et al. |
| 5,797,520 | A | | 8/1998 | Donahue |
| 5,803,367 | A | | 9/1998 | Heard et al. |
| 5,810,258 | A | | 9/1998 | Wu |
| 5,816,501 | A | | 10/1998 | LoPresti et al. |
| 5,853,102 | A | | 12/1998 | Jarrett |
| 5,918,815 | A | | 7/1999 | Wu |
| 5,975,346 | A | | 11/1999 | Imperato et al. |
| 6,012,651 | A | * | 1/2000 | Spitznagel .................. 239/345 |
| 6,053,314 | A | | 4/2000 | Pittman |
| 6,053,429 | A | | 4/2000 | Chang |
| 6,092,740 | A | * | 7/2000 | Liu ............................ 239/346 |
| 6,165,159 | A | | 12/2000 | Blanton |
| 6,189,809 | B1 | | 2/2001 | Schwebemeyer |
| 6,213,410 | B1 | | 4/2001 | Spitznagel |
| 6,302,445 | B1 | | 10/2001 | Kugele |
| 6,435,426 | B1 | | 8/2002 | Copp, Jr. |
| 6,536,687 | B1 | | 3/2003 | Navis et al. |
| 6,588,681 | B1 | | 7/2003 | Rothrum et al. |
| 6,595,441 | B1 | | 7/2003 | Petrie et al. |
| 6,698,670 | B1 | * | 3/2004 | Gosis et al. ................ 239/376 |
| 6,718,664 | B1 | | 4/2004 | Williams |
| 6,820,824 | B1 | | 11/2004 | Joseph et al. |
| 6,877,677 | B1 | * | 4/2005 | Schmon et al. ............. 239/346 |
| 6,886,707 | B1 | | 5/2005 | Giraud |
| 6,938,836 | B1 | * | 9/2005 | Bouic ......................... 239/346 |
| 2002/0134861 | A1 | | 9/2002 | Petrie et al. |
| 2002/0175171 | A1 | | 11/2002 | Stewart et al. |
| 2003/0006310 | A1 | | 1/2003 | Rothrum et al. |
| 2003/0006311 | A1 | | 1/2003 | Rothrum et al. |
| 2003/0209568 | A1 | | 11/2003 | Douglas et al. |
| 2003/0209573 | A1 | | 11/2003 | Bouie |
| 2003/0213857 | A1 | | 11/2003 | Schmon et al. |
| 2004/0046051 | A1 | | 3/2004 | Santa Cruz et al. |

FOREIGN PATENT DOCUMENTS

| | | | |
|---|---|---|---|
| EP | 1 210 181 | B1 | 10/2003 |
| EP | 1 415 719 | A1 | 5/2004 |
| EP | 1 424 135 | A1 | 6/2004 |
| FR | 2 774 928 | | 2/1998 |
| FR | 2774922 | A1 | 8/1999 |
| FR | 2798868 | A1 | 3/2001 |
| GB | 961183 | | 6/1964 |
| JP | 06 335643 | A | 12/1994 |
| WO | WO 95/07762 | | 3/1995 |
| WO | WO 95/11170 | | 4/1995 |
| WO | WO 95/22409 | | 8/1995 |
| WO | WO 98/32539 | | 7/1998 |
| WO | WO 01/12337 | A1 | 2/2001 |
| WO | WO 02/072276 | A1 | 9/2002 |
| WO | WO 02/085533 | A1 | 10/2002 |
| WO | WO 03/006170 | A2 | 1/2003 |
| WO | WO 03/045575 | A1 | 6/2003 |
| WO | WO 03/082475 | A1 | 10/2003 |
| WO | WO 03/095101 | A1 | 11/2003 |
| WO | WO 2004/037431 | A1 | 5/2004 |
| WO | WO 2004/037432 | A1 | 5/2004 |
| WO | WO 2004/037433 | A1 | 5/2004 |
| WO | WO 2004/052552 | A1 | 6/2004 |
| WO | WO 2004/087332 | A1 | 10/2004 |
| WO | WO 2005/075097 | A1 | 8/2005 |

OTHER PUBLICATIONS

Ryne C. Allen, To Shield or Not to Shield, Aug., 1999, Desco Industries, Inc., Marlboro, Massachusetts.
Typical Conductive Additives, RTP Company.
Polymers as Additives, Lilli Manolis Sherman, Gardner Publications, Inc.
Markus C. Grob and Doris Eisermann, Permanent Antistats: New Developments for Polyolefin Applications, Polylefins XI-1999, Polymer Modifers & Additives Division, SPE, Basel, Switzerland.
Antistatic Agent, About, Inc., 2004.
Steve Fowler, OHMS Per Square What?, ESD & Electrostatics Magazine, May, 2004.

* cited by examiner

ADAPTER ASSEMBLY FOR A FLUID SUPPLY ASSEMBLY

BACKGROUND OF THE INVENTION

The present invention is directed generally to a fluid supply assembly for a fluid applicator, and more particularly to an adapter assembly for connecting a fluid supply assembly to a fluid applicator.

Typically, the connection between a fluid supply assembly and a fluid applicator, such as a paint sprayer for automobile painting and repainting in body shops, is via an adapter between the fluid supply assembly and the fluid applicator, such as with a threaded connection between the supply cup and the adapter. However, it is difficult to prevent leaking from threaded connections without precise machining of the threads or the use of seals, particularly for threaded connections having a short length.

Attempts have been made to create a connection between a supply cup and an adapter that can be engaged and disengaged quickly and easily. U.S. Pat. Nos. 6,356,687 and 6,595,441 disclose a connection between a paint cup and an adapter which has several parts. However, the adapter can be rotated without being fully inserted. Thus, the adapter may appear to be securely connected to the paint cup when it is not. An improper connection can result in the paint cup falling off the paint sprayer, creating a mess. Moreover, the connections described in these patents are unnecessarily complex.

Therefore, there remains a need for a connection between a fluid supply assembly and an adapter that can be engaged quickly, easily, and securely, and that provides a strong tight seal around the connection.

SUMMARY OF THE INVENTION

The present invention meets this need by providing an adapter assembly for connecting a fluid supply assembly to a fluid applicator. The adapter assembly includes an outer lid for the fluid supply assembly, the outer lid having an integral generally cylindrical fitting with an opening therethrough, the fitting having a tab at an upper end and a horizontal stop at a lower end; and an adapter having a first end and a second end, and a bore between the first end and the second end, the first end having a connecting surface adapted to mate with a complementary connecting surface on the fluid applicator, the second end having a portion having a first shape and a portion having a second shape, the portion having the first shape being adapted to pass by the tab so that the second end can be inserted into the fitting, and the portion having the second shape being adapted so that it cannot pass by the tab, the second end having a height so that the second end fits between the horizontal stop and the tab of the fitting, whereby when the adapter is rotated, the portion having the second shape is retained under the tab so that the adapter is locked to the outer lid.

Another aspect of the invention is method of connecting a fluid supply assembly to a fluid applicator. The method includes providing an outer lid for the fluid supply assembly, the outer lid having an integral generally cylindrical fitting with an opening therethrough, the fitting having a tab at an upper end and a horizontal stop at a lower end; providing an adapter having a first end and a second end, and a bore between the first end and the second end, the first end having a connecting surface adapted to mate with a complementary connecting surface on the fluid applicator, the second end having a portion having a first shape and a portion having a second shape, the portion having the first shape being adapted to pass by the tab and the portion having the second shape being adapted so that it cannot pass by the tab, the second end having a height so that the second end fits between the horizontal stop and the tab of the fitting; connecting the first end of the adapter to the fluid applicator; matching the portion having the first shape with the tab of the fitting and inserting the second end of the adapter into the fitting in the outer lid until the second end reaches the horizontal stop; and rotating the second end of the adapter in the fitting so that the portion having the second shape is retained under the tab thereby locking the adapter to the outer lid.

DETAILED DESCRIPTION OF THE INVENTION

Figure 1:
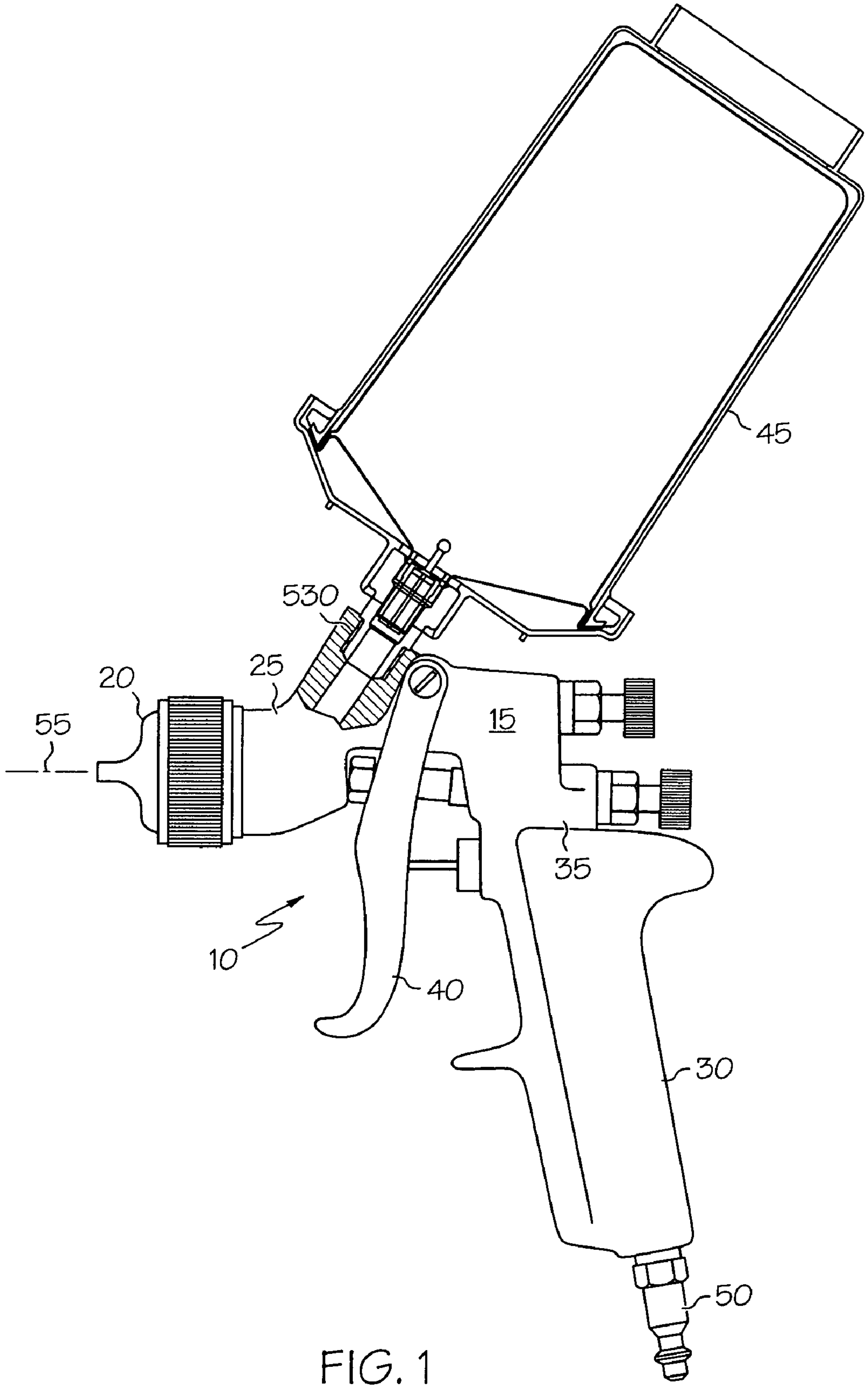
FIG. 1 is side elevation view of a gravity-feed paint sprayer with a fluid supply assembly according to the present invention.

A fluid supply assembly attached to a fluid applicator is shown in FIG. 1. In one embodiment, the fluid supply assembly is for feeding liquid, such as paint, to the fluid applicator, such as a paint sprayer. The present invention will be described for a paint sprayer, such as a gravity feed paint sprayer for use in applying paint to coat substrate surfaces. The paint sprayer can be used in the automotive refinishing market, such as automobile body shops, for repainting automobiles. Although the fluid supply assembly is described for a paint sprayer, it is not limited to such use. It can be used for supplying other flowable liquids, including, but not limited to, beverages, foods, condiments (such as ketchup), gasoline, petrochemicals and hydrocarbons, water, water-based solutions, solvent-based solutions, emulsions, adhesives, and the like.

Referring to FIG. 1, a paint sprayer 10 is shown. It includes a body 15, a nozzle assembly 20 secured to a front end 25 of body 15, and a handle 30 depending from a rear end 35 of body 15. A trigger 40 is pivotally secured to body 15 for the manual actuation of sprayer 10. A top-mounted paint supply assembly 45 is mounted to body 15 near front end 25 for feeding paint to nozzle assembly 20. An air connector 50 is connected to an air hose (not shown) for the delivery of pressurized air to nozzle assembly 20, wherein the delivery of pressurized air is controlled by trigger 40.

Compressed air from air connector 50 is delivered through an internal passage (not shown) to nozzle assembly 20 and the compressed air acts to atomize paint and deliver it through nozzle assembly 20 to spray paint about paint axis 55. Paint is delivered to nozzle assembly 20 from paint supply assembly 45.

FIGS. 11–15 show one embodiment of the adapter assembly 500 of the present invention. The adapter assembly 500 includes adapter 505 for connecting between paint sprayer 10 and outer lid 508. Adapter 505 includes a first end 510 engagable with paint sprayer 10, shown in FIG. 1, a second end 515 engagable with outer lid 508, and a hollow bore 520 between first end 510 and second end 515.

In one embodiment, first end 510 has a diameter smaller than second end 515. First end 510 is generally cylindrical in shape. First end 510 has a connecting surface 525 for engaging with a complementary connecting surface 530 on the paint sprayer 10. Suitable connecting surface 525 and complementary connecting surface 530 include, but are not limited to, threading helical surfaces, lugs and grooves, tapered connections, bayonet connections, snap connections, or first end 510 can be integral with paint sprayer 10 so that the adapter 505 is a feed conduit into sprayer 10. Desirably, the connecting surface 525 and complementary connecting surface 530 are threads of a typical size and pitch for paint sprayers so that the fluid supply assembly can be used with any of several sprayers.

Second end 515 has a portion having a first shape 535 and a portion having a second shape 540. The portion having the first shape 535 can be flat, and the portion having the second shape 540 can be curved, if desired. Alternatively, the portion having the first shape can have a simple or complex shape, including but not limited to, curved outward or inward. If the portion having the first shape is curved, it should have a different curvature from that of the portion having the second shape. The portion having the second shape can also have a shape other than curved. Desirably, second end 515 has opposing flat portions 535 and opposing curved portions 540. There can be one or more flat portions, and one or more curved portions. Desirably, there are two opposing flat portions and two opposing curved portions.

The outer lid 508 has an integral generally cylindrical fitting 545 with an opening 550 therethrough. The opening 550 is generally circular. The opening 550 in the outer lid 508 has at least one tab 555 extending inward at the upper end of the opening 550. Tab 555 has a shape that allows the portion having the first shape to pass next to it, but not the portion having the second shape, so that the second end 515 can be inserted into opening 550. If a flat portion 535 is used, tab 555 is typically flat. Tab 555 can be at the edge of the upper end of the fitting 545, or it can be downward from the edge, as desired.

Figure 15:
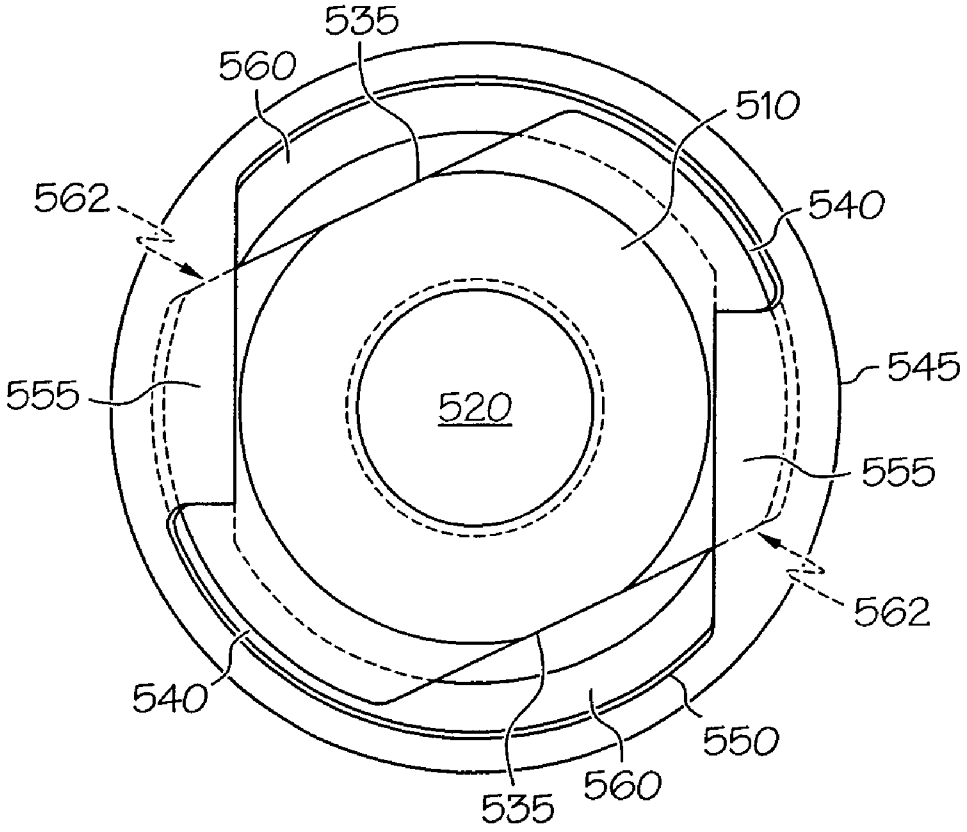
FIG. 15 is a top view of the assembled connection of FIG. 11 after rotation (without the filter).

There is at least one horizontal stop 560 in opening 550 below tab 555. Second end 515 has a height so that it fits between horizontal stop 560 and tab 555 of the fitting 545 so that the second end 515 enters only the desired distance. When second end 515 hits horizontal stop 560, the adapter 505 is rotated to lock the fluid supply assembly to the paint sprayer 10, as shown in FIG. 15. Alternatively, the outer lid 508 could be rotated onto the adapter 505. When the adapter 505 is rotated, tabs 555 are engaged with the top of curved portion 540 of second end 515.

There is at least one vertical stop 562 on the inside of opening 550. Vertical stop 562 prevents the adapter 505 from rotating so far that the flat portions 535 again become mated with the tabs 555 so that the adapter 505 could become disengaged. Vertical stops 562 can extend from tab 555 to horizontal stop 560, if desired. Alternatively, vertical stops 562 can extend part of the distance between tab 555 and horizontal stop 560.

The adapter 505 cannot be rotated until it is fully inserted into opening 550 because of flat portions 535 and curved portions 540 of second end 515, flat tabs 555 of the fitting 545, and the height of second end 515. This prevents the fluid supply assembly from falling off the adapter 505 due to improper assembly of the connection. In addition, the sides of fitting 545 support the curved portion 540 of second end 515 which reduces the ability of second end 515 to move within fitting 545. This helps to provide a stable connection between the fluid supply assembly and the adapter.

The adapter assembly can include a disposable lid 565 with a fitting 570, if desired. As the second end 515 enters the fitting 545 of the outer lid 508, the fitting 570 of the disposable lid 565 enters the bore 520 of the adapter 505. This connects the interior of the fluid supply assembly to the passageway in the spray gun.

The adapter assembly can optionally include a filter 575. The filter 575 can be inserted into the bore 520 of the adapter 505. Filter 575 can optionally include a projection 580 to prevent the collapsing disposable cup from closing the fluid connection between the interior of the fluid supply assembly and the bore 520 of the adapter 505. Projection 580 can also be used to remove the filter 575 as needed for cleaning or replacement.

The adapter assembly of the present invention can be used with any fluid supply assembly which has an outer lid with a fitting as described herein. It is particularly suitable for use with the fluid supply assembly described in commonly assigned application for Fluid Supply Assembly, Ser. No. 10/759,352, filed Jan. 16, 2004, the disclosure of which is incorporated herein by reference.

Figure 2:
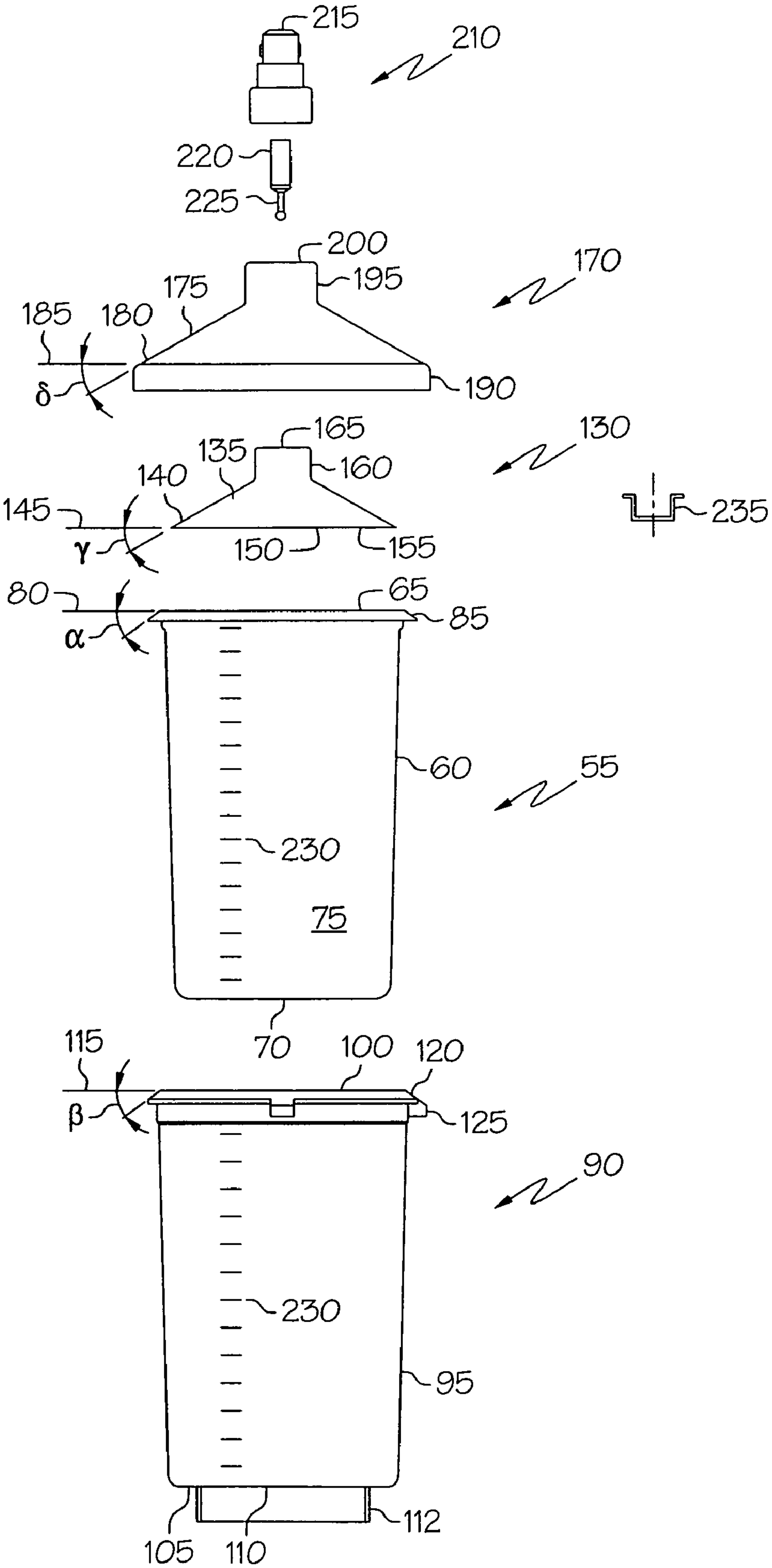
FIG. 2 is an exploded side sectional view of one embodiment of a fluid supply assembly according to the present invention.
Figure 3:
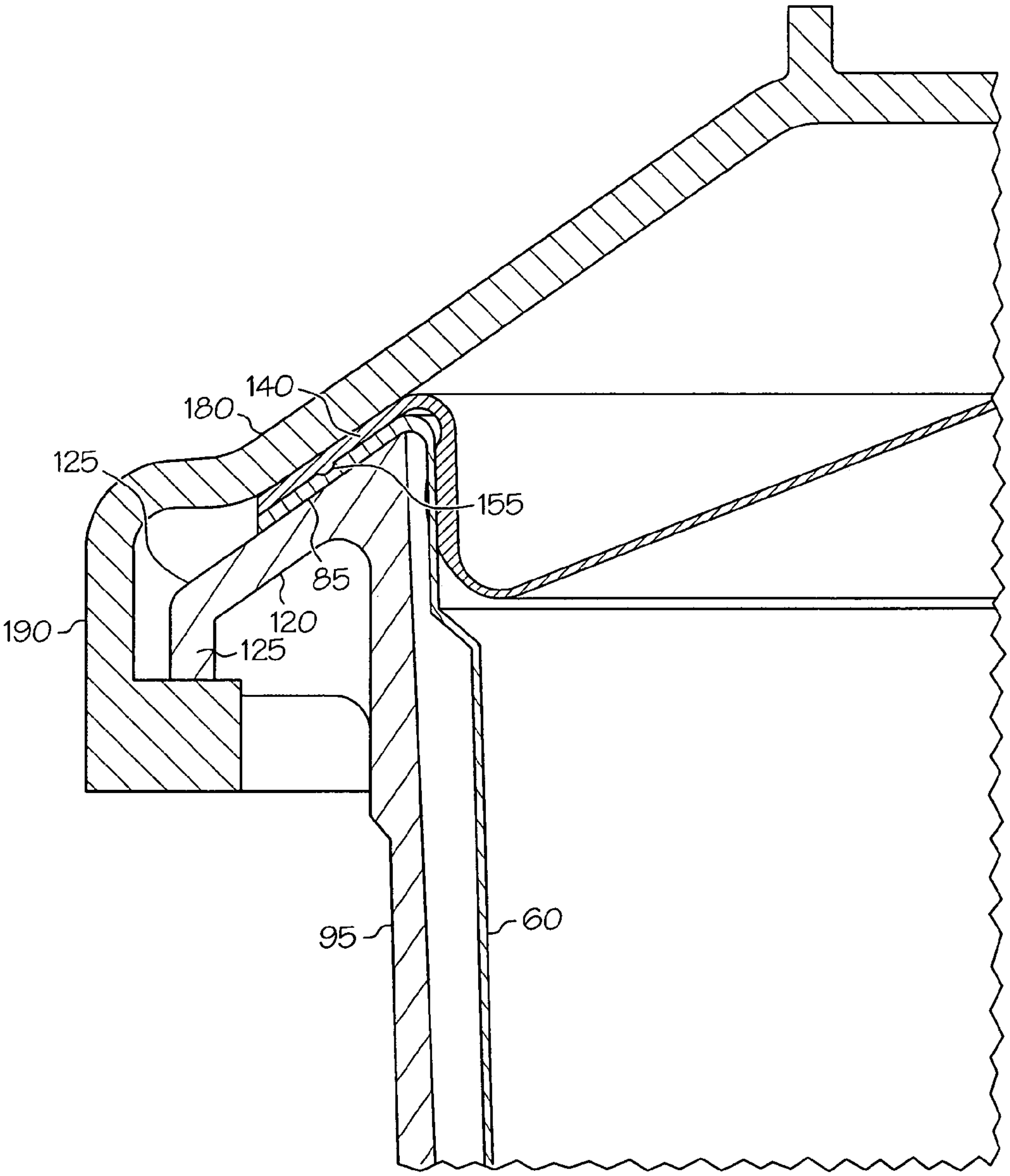
FIG. 3 is partial side sectional view of the assembled connection between the reusable cup holder and reusable outer lid of the present invention.

FIGS. 1–3 show a first embodiment of paint supply assembly 45 of the present invention. The paint supply assembly includes disposable cup 55. Disposable cup 55 has a side wall 60 which is generally cylindrical. The outlet end 65 at the top of the cup is open, and the bottom 70 is closed. The side wall 60, outlet end 65, and bottom 70 define an interior 75. The outlet end 65 defines an axis 80. There is a flange 85 extending outward and downward from the edge of the outlet end 65. The flange 85 extends downward at an angle $\alpha$ in a range of from about 10° to about 70° from the axis 80 of the outlet end 65.

The disposable cup 55 can be made of transparent or translucent plastic if desired. Suitable plastics include, but are not limited to, low density polyethylene. The disposable cup has flexible side walls which allow the disposable cup to collapse as paint is dispensed. The side walls can be thin, for example in the range of about 0.003 in. to about 0.008 in. The bottom can be slightly thicker, in the range of about 0.003 to about 0.02 in., so that the bottom will remain substantially flat as the side walls collapse, if desired. No air vent is needed in the disposable cup because the side walls collapse. This allows the user to discharge the paint sprayer at any angle without leaks and to use more of the paint in the cup than is possible with conventional gravity feed paint cups.

Reusable cup holder 90 is generally cylindrical. It has a side wall 95, an open upper end 100, and a lower end 105. The lower end 105 has an opening 110 in it. The opening 110 can cover all or almost all of the lower end 105, if desired. Alternatively, the lower end could have one or more smaller openings. The opening 110 in the lower end 105 allows ambient air pressure to help the disposable cup collapse during use. Optionally, the reusable cup holder 90 can include one or more legs 112 extending downward from the lower end 105. The legs can extend all of the way around the opening 110 (i.e., a circular rib) or only a part of the way around the opening 110. The legs 112 can assist in stacking the fluid supply assemblies as described below.

The upper end 100 defines an axis 115. A flange 120 extends outward and downward from an edge of the upper end 100. The flange 120 extends downward at an angle β in a range of from about 10° to about 70° from the axis 115 of the upper end 100. The angle β is substantially the same as the angle α of the flange 85 of disposable cup 55. When the disposable cup 55 is placed in the reusable cup holder 90, the flange 120 of reusable cup holder 90 supports the flange 85 of the disposable cup 55.

There is a connecting surface 125 at the upper end 100 of the reusable cup holder 90. The connecting surface 125 can be on the sidewall, extend out from the side wall, or it can extend outward from the end of the flange 120, if desired.

The reusable cup holder 90 can be made of a rigid plastic, including, but not limited to, polypropylene or high density polyethylene. Desirably, the plastic selected is strong enough that the reusable cup holder can withstand the clamping force of a paint shaker machine. The plastic is desirably transparent or translucent, although it could be opaque. If an opaque plastic is used, the side wall should have elongated openings in it so that the disposable cup and its contents can be seen. Typically, the walls can be in the range of from about 0.02 in. to about 0.08 in. thick.

The disposable lid 130 has a generally frustoconical portion 135. The outer edge 140 of the generally frustoconical portion 135 defines an axis 145. The angle γ of the outer edge 140 of the generally frustoconical portion 135 is in a range of from about 10° to about 70° from the axis 145. The angle γ is substantially the same as the angle α of the flange 85 of disposable cup 55. The disposable lid 130 fits over the disposable cup 55, and the edge 140 of the disposable lid 130 mates with the flange 85 of the disposable cup 55. The inside of the disposable lid 130 can have a downward extending rib 150, if desired. The downward extending rib 150 extends into the interior 75 of the disposable cup and mates with the inside of the side wall 60 of the disposable cup 55, forming a seal. Additionally, there can be a downwardly projecting sealing bead 155 on the inside of the disposable lid 130. The downwardly projecting sealing bead 155 mates with the flange 85 of the disposable cup 55 to aid in forming a seal.

There is a fitting 160 integrally connected to the generally frustoconical portion 135. The fitting 160 has an opening 165 extending through it.

The disposable lid 130 can be made of a transparent, translucent, or opaque plastic. Suitable plastics include, but are not limited to, polypropylene or high density polyethylene.

The reusable outer lid 170 has a generally frustoconical portion 175. The outer edge 180 of the generally frustoconical portion 175 defines an axis 185. The angle δ of the outer edge 180 of the generally frustoconical portion 175 is in a range of from about 10° to about 70° from the axis 185. The angle δ is substantially the same as the angle β of the flange 120 of reusable cup holder 90. The outer edge 180 of the reusable outer lid 170 mates with the flange 120 of the reusable cup holder 90. There is a complementary connecting surface 190 at the outer edge 180 of the reusable outer lid 170. In this embodiment, the complementary connecting surface 190 extends downward from the outer edge 180, although other arrangements are possible. The complementary connecting surface 190 mates with the connecting surface 125 of the reusable cup holder 90 to seal the reusable cup holder 90 and reusable outer lid 170 together.

The reusable outer lid has a fitting 195 integrally connected to the generally frustoconical portion 175. The fitting 195 has an opening 200 extending through it. The fitting 160 of the disposable lid 130 fits into the fitting 195 of the reusable outer lid 170.

The reusable outer lid 170 can be made of a strong, tough plastic. Desirably, the plastic selected is strong enough that the reusable outer lid can withstand the clamping force of a paint shaker machine. Examples of suitable plastic include, but are not limited to, acetal. Acetal is not typically transparent. Therefore, the reusable outer lid 170 can include one or more sight holes so that the paint level is visible to the user, if desired. The sight hole can also allow the user to write the name of the name of the paint type on the disposable lid, and it permits easy removal of the disposable lid from the reusable outer lid.

A conduit 210 connects the fluid supply assembly to the paint sprayer 10. The conduit 210 mates with the fitting 195 of the reusable outer lid 170 and the fitting 160 of the disposable lid 130. The conduit 210 has an opening 215 through it. There is a path for fluid to flow from the interior 75 of the disposable cup 55 through the opening 165 in the disposable lid 130 through the opening 215 in conduit 210 to the paint sprayer 10. An optional filter 220 can be placed into the opening 215 in the conduit 210, the opening 200 in the reusable outer lid 170, or the opening 165 in the disposable lid 130 to filter out impurities.

In order to use the fluid supply assembly, the disposable cup 55 is placed into the reusable cup holder 90. The flange 85 of the disposable cup 55 mates with the flange 120 of the reusable cup holder 90. The flange 85 centers the disposable cup 55 in the reusable cup holder 90.

Optionally, there can be indicia 230 on either the disposable cup 55 or the reusable cup holder 90 or both. The indicia 230 can be molded in the side, printed on the side, a label can be attached to the side, or the indicia can be supplied in some other fashion. The indicia 230 can be used to measure paint components. Alternatively, the disposable cup and reusable cup holder can be used on a scale, or with a measuring stick to measure the paint components.

The indicia can include mixing scales with one or more mixing ratios, e.g., 4:1 mixing ratio, 2:1 mixing ratio; 3:2:1 mixing ratio, etc. Each mixing ratio might include one or more different sized divisions so that different amounts of fluid could be measured using each mixing ratio. The indicia can also include one or more universal scales, i.e., scales with equal sized divisions. One universal scale might have 20 equal divisions, another 10 equal divisions, a third 5 equal divisions. There can be as many universal scales as needed. The multiple universal scales allow the user to measure different amounts of fluid without using the mixing ratio scales, which would not have to be included. The user could select the appropriate universal scale based on the amount of fluid needed.

Alternatively, the measuring guide could have indicia printed on a clear, thin, flat, plastic sheet. The plastic sheet has connecting parts on opposite sides of the sheet, including, but not limited to, tabs and slots. The plastic sheet is formed into a cylinder, and the tabs are inserted into the slots. The measuring guide can be placed on the table, and the disposable cup, or the reusable cup holder with the disposable cup in it, can be placed inside the cylinder. After the paint components are measured, the disposable cup (and the reusable cup holder if present) is removed from the cylinder. This can be done by lifting the disposable cup by the flange, or by disconnecting the tabs and slots on the sheet. Optional removal tabs on the flange 180 degrees apart can assist in removing the disposable cup. The disposable cup can then be placed in the reusable cup holder (if not already there). This measuring guide improves visibility and accuracy in measuring the paint components. The rectangular shape is easy to manufacture. It eliminates the necessity for accurate placement of a label on the disposable cup or reusable cup holder. It also allows more direct viewing of the indicia than with the label (i.e., through the label, the reusable cup holder, and the disposable cup). It is particularly advantageous when a smaller diameter disposable cup is used because the indicia can be placed right next to the disposable cup. Finally, if the disposable cup is used alone, the reusable cup holder stays cleaner because it is not used when pouring and measuring paint.

The sheets may be formed in different sizes so that the measuring guides can be used with different sizes of disposable cups. A larger sheet could be used with the reusable cup holder and/or the larger disposable cup. The cylinder formed by the larger sheet is big enough so that the reusable cup holder and/or the larger disposable cup fit inside. The larger sheet could include a marking, such as a dotted line near the bottom, to allow proper alignment of the indicia depending whether the larger disposable cup is used with the reusable cup holder or not. The entire sheet might be used when the larger disposable cup is used with a reusable cup holder having legs. When the larger disposable cup is used alone (or the reusable cup does not affect the alignment, e.g. because it does not have legs), the sheet could be cut at the marking. This allows proper alignment in either situation. A smaller sheet could be used when a smaller disposable cup is used. The reusable cup holder would not generally be used with the smaller disposable cup when measuring fluid in order to provide proper alignment of the indicia and the smaller disposable cup.

After the disposable cup 55 is filled with paint, the disposable lid 130 is placed on top of the disposable cup 55. The angle $\gamma$ of the edge 140 of disposable lid 130 is substantially the same as the angle a of the flange 85 of disposable cup 55 so that the edge 140 of disposable lid 130 mates with the flange 85 of the disposable cup 55. The angle $\gamma$ centers the disposable lid 130 on the disposable cup 55. The angle $\gamma$ of the disposable lid 130 also allows for additional sealing area without an increase in the overall outside diameter of the fluid supply assembly.

The downward extending rib 150 on the inside of the disposable lid 130 fits inside the disposable cup 55. There can be one or more downward extending ribs 150 around the disposable lid 130 which extend part way around the inside of the disposable lid 55, or the rib can extend all the way around. The downward extending rib 150 keeps the disposable lid 55 in place, and it can also act as a seal. The disposable lid 55 can also have a downwardly extending sealing bead 155 which contacts the flange 85 of the disposable cup 55 to improve sealing.

The reusable outer lid 170 is placed on top of the disposable lid 130. It is tightened to the reusable cup holder 90 using the connecting surface 125 of the reusable cup holder 90 and the complementary connecting surface 190 of the reusable outer lid 170. Suitable connecting surfaces and complementary connecting surfaces include, but are not limited to, threaded connections, lugs and grooves, and pins and slots.

The outer edge 180 of the reusable outer lid 170 has an angle $\delta$ which is substantially the same as the angle $\beta$ of the flange 120 of reusable cup holder 90. The tightening of the reusable outer lid 170 to the reusable cup holder 90 clamps the edge 140 of disposable lid 130 and flange 85 of disposable cup 55 together between edge 180 of reusable outer lid 170 and flange 120 of reusable cup holder 90. The angle increases the clamping force without an increase in torque.

The angles $\alpha$ of the flange 85 of disposable cup 55, $\gamma$ of the edge 140 of disposable lid 130, $\beta$ of flange 120 of reusable cup holder 90, and $\delta$ of edge 180 of reusable outer lid 170 are generally in the range of about 10° to about 70° from the respective axis, typically about 20° to about 60°, more typically about 30° to about 50°, more about typically 35° to about 45°.

When the angles $\alpha$ and $\gamma$ of the flange 85 of disposable cup 55 and the edge 140 of disposable lid 130 match the angle at which the fluid supply assembly is attached to the paint sprayer so that in use the disposable lid is substantially parallel to the paint axis of the paint sprayer, almost all of the paint in the disposable cup is used. Because the cost for a typical mixed paint is over $1.00 per fluid ounce, reducing paint waste is an important consideration.

A plug 235 can be used to cover the fitting 160 on the disposable lid 130. The plug 235 can fit inside or outside of the fitting 160. The plug 230 seals the opening 165 in the fitting 160 for shaking or storage.

In one embodiment, the fluid supply assembly of the present invention is strong enough to be placed in a paint shaker machine without any additional support.

The conduit 210 is placed into the fitting 195 in the reusable outer lid 170. An optional filter 220 is inserted in the opening 215 of the conduit 210. Alternatively, the filter 220 could be placed in the fitting 160 of the disposable lid 130 or the fitting 195 of the reusable outer lid 170. The filter 220 can have a projection 225, if desired, which prevents the collapsing disposable cup 55 from blocking the opening 165 through to the conduit 210. Projection 225 can also be used to remove the filter 225 for cleaning or disposal. The conduit 210 can be filled with solvent and plugged for storage, if desired. If an inside fitting plug 235 is used for the fitting 160 on the disposable cup 130, the same size plug may also fit in the conduit.

The fluid supply assembly is attached to the conduit 210. The conduit 210 connects to the reusable outer lid 170 and the paint sprayer 10 and provides a flow path from the interior 75 of the disposable cup 55 to the paint sprayer 10.

Figure 4:
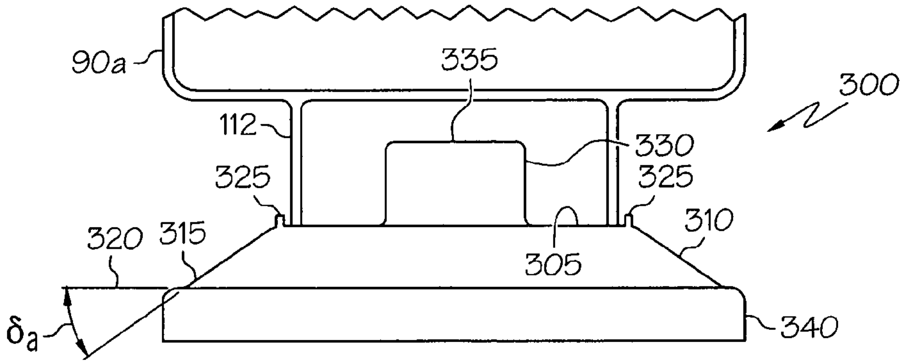
FIG. 4 is a partial side sectional view of an alternate embodiment of the reusable outer lid showing stacking of the fluid supply assemblies of the present invention.

An alternate embodiment for the reusable outer lid is shown in FIG. 4. In this embodiment, the reusable outer lid 300 has an inner portion 305 and an outer portion 310. The outer portion 310 is generally frustoconical. The outer edge 315 defines an axis 320. The angle $\delta a$ of the outer edge 315 is in a range of from about 10° to about 70° from the axis 320. As in the first embodiment, the angle $\delta a$ is substantially the same as the angle $\beta$ of flange 120 reusable cup holder 90.

The inner portion 305 is substantially flat. Alternatively, it could be at an angle different from the angle δa of the outer edge 315. It can optionally include one or more upward extending prongs 325. The prongs 325 can extend all or part of the way around the reusable outer lid 300. They can be positioned to mate with the legs 112 of an adjacent reusable cup holder 90*a*, allowing the fluid supply assemblies to be stacked on top of one another.

If the distance across the legs 112 of the reusable cup holder is smaller than the diameter of the lower end of the reusable cup and the reusable cup holder is to be used in a paint shaker, it may be desirable to include a second ring on the bottom of the reusable cup holder. The second ring should be the same (or substantially the same) diameter as the lower end of the reusable cup holder in order to transfer the paint shaker's clamping force to the side wall of the reusable cup holder, reducing deflection of the bottom of the reusable cup holder.

The reusable outer lid has a fitting 330 integrally connected to the inner portion 305. The fitting 330 has an opening 335 extending through it.

The outer edge 315 of the reusable outer lid 300 mates with the flange 120 of the reusable cup holder 90. There is a complementary connecting surface 340 at the outer edge 315 of the reusable outer lid 300. The complementary connecting surface 340 mates with the connecting surface 125 of the reusable cup holder 90 to seal the reusable cup holder 90 and reusable outer lid 300 together.

Figure 5:
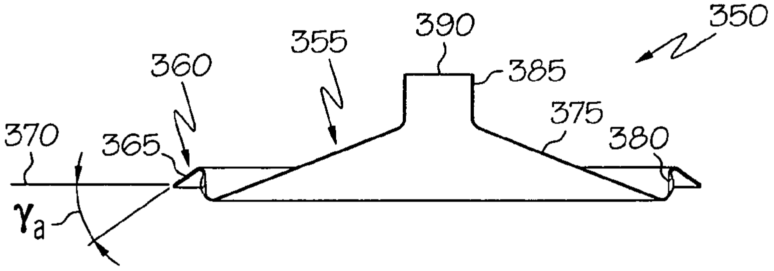
FIG. 5 is a side sectional view of an alternate embodiment of the disposable lid of the present invention.
Figure 6:
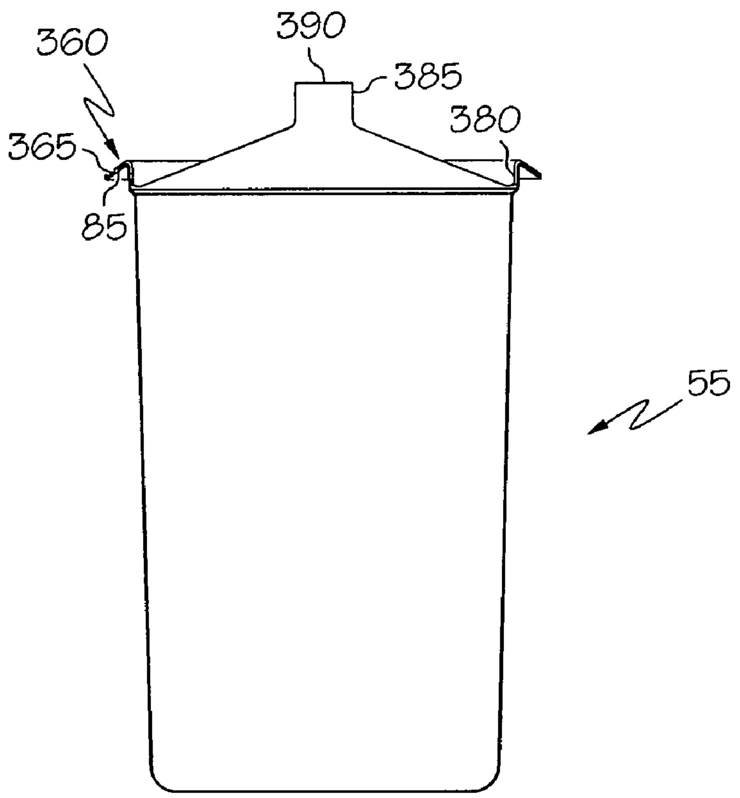
FIG. 6 is an assembled side sectional view of the alternate embodiment of the disposable lid of FIG. 5 and the disposable cup.

An alternative embodiment of the disposable lid is shown in FIGS. 5–6. The disposable lid 350 has an inner portion 355 and an outer portion 360. The outer portion 360 is generally frustoconical. The outer edge 365 of the outer portion 360 defines an axis 370. The angle γa of the outer edge 365 of the outer portion 360 is in a range of from about 10° to about 70° from the axis 370. As in the first embodiment, the angle γa is substantially the same as the angle α of the flange 85 of disposable cup 55.

The inner portion 355 has a generally frustoconical part 375 and an upwardly extending projection 380 at the outer end. The upwardly extending projection 380 is connected to the outer portion 360. There is a fitting 385 integrally connected to the inner portion 355. The fitting 385 has an opening 390 extending through it.

The outer portion 360 mates with the flange 85 of the disposable cup 55. The upwardly extending projection 380 fits inside the outlet end 65 the disposable cup 55 forming an additional seal.

Figure 7:
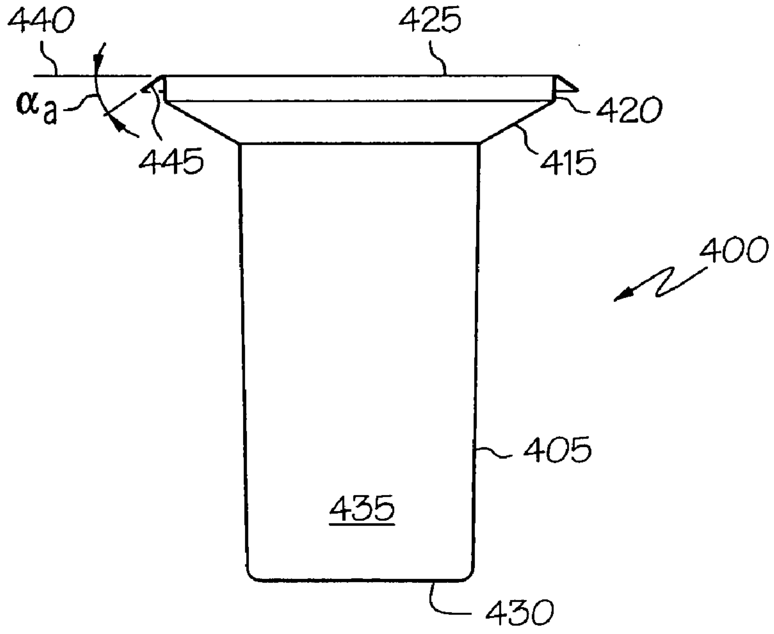
FIG. 7 is a side sectional view of an alternate embodiment of the disposable cup of the present invention.

Alternate embodiments of the disposable cup are shown in FIGS. 7–10. In FIG. 7, the disposable cup 400 has a generally cylindrical lower side wall portion 405, a generally frustoconical intermediate side wall portion 415, and a generally cylindrical upper side wall portion 420.

The outlet end 425 at the top of the disposable cup 400 is open, and the bottom 430 is closed. The lower side wall portion 405, intermediate side wall portion 415, and upper side wall portion 420, outlet end 425, and bottom 430 define an interior 435. The interior 435 is smaller than the interior 75. The smaller diameter of the lower side wall portion allows accurate measuring of the paint ratios when less paint is to be used.

The outlet end 425 defines an axis 440. There is a flange 445 extending outward and downward from the edge of the outlet end 425. The flange 445 extends downward at an angle αa in a range of from about 10° to about 70° from the axis 440 of the outlet end 425. The outlet end 425 is adapted to be placed into the reusable cup holder, so it sized to fit in the reusable cup holder.

Alternatively, the generally cylindrical lower side wall portion could be off centered, i.e., not concentric with the upper side wall portion. This would bring the lower side wall portion close to the side wall of the reusable cup holder, allowing easy reading of any measuring indicia.

Figure 8:
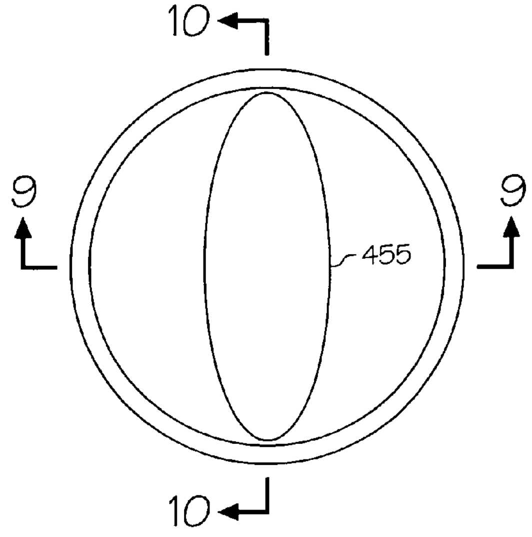
FIG. 8 is a top view of an alternate embodiment of the disposable cup of the present invention.
Figure 9:
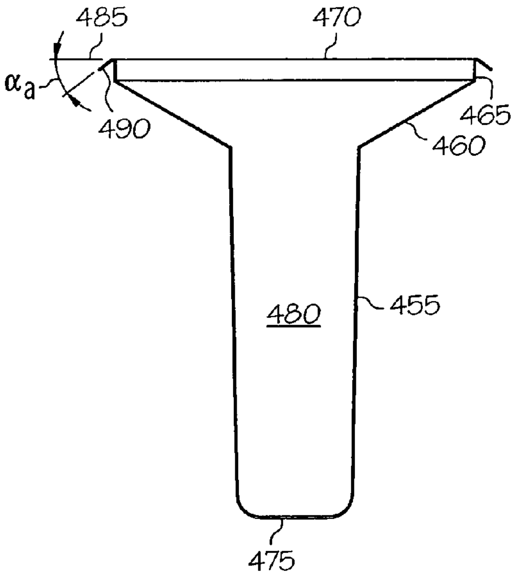
FIG. 9 is a side sectional view of the disposable cup of FIG. 8 in one axis.
Figure 10:
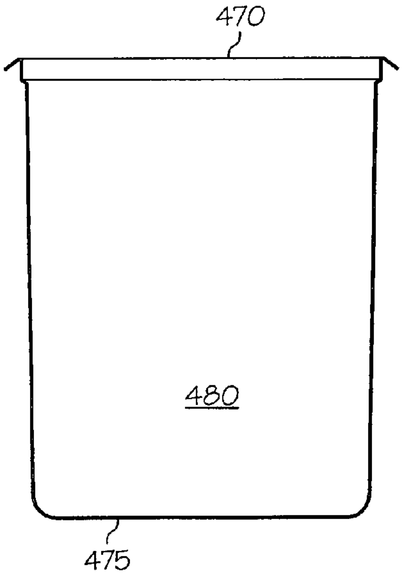
FIG. 10 is a side sectional view of the disposable cup of FIG. 8 in another axis.
Figure 11:
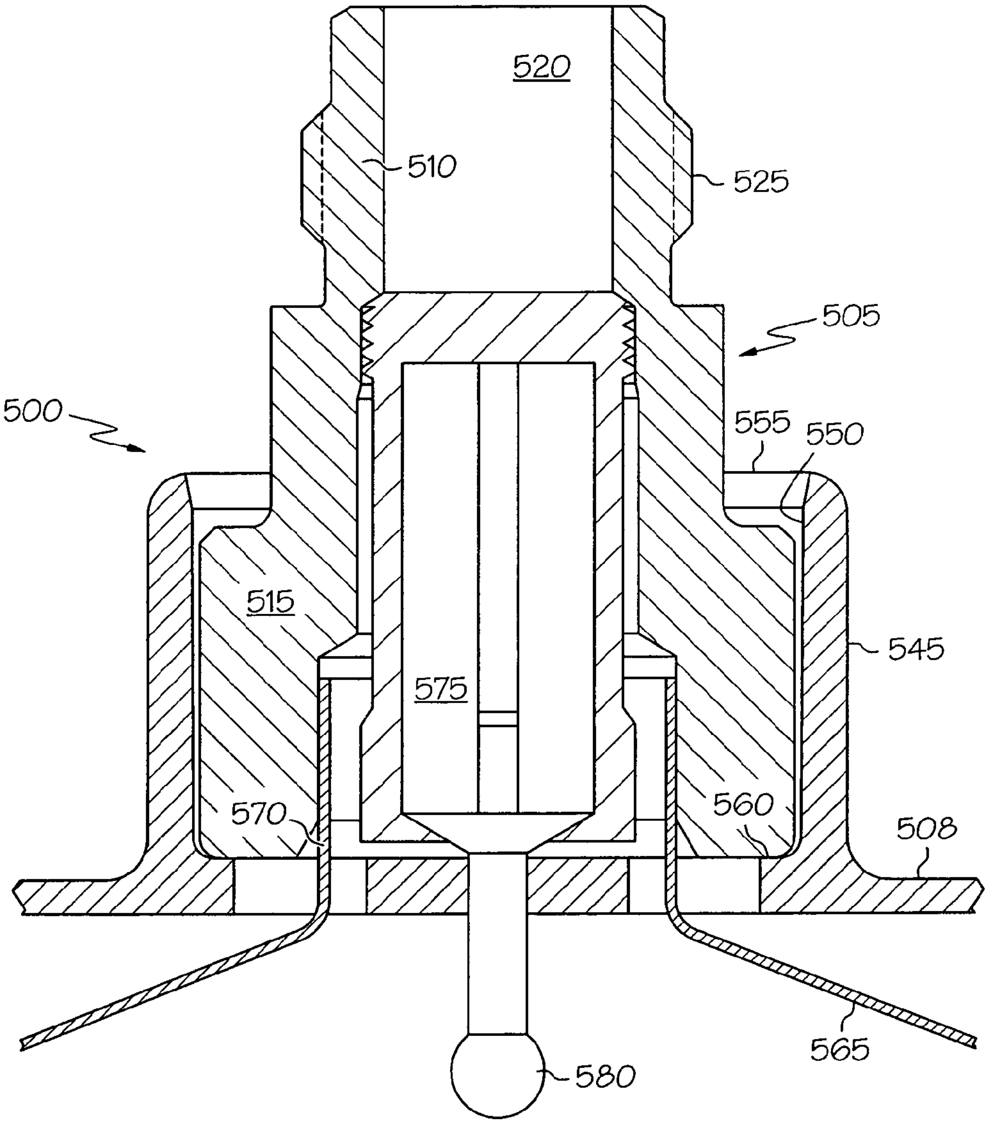
FIG. 11 is a partial assembled side sectional view of the connection between one embodiment of an adapter useful in the present invention and the reusable outer lid of the present invention.
Figure 12:
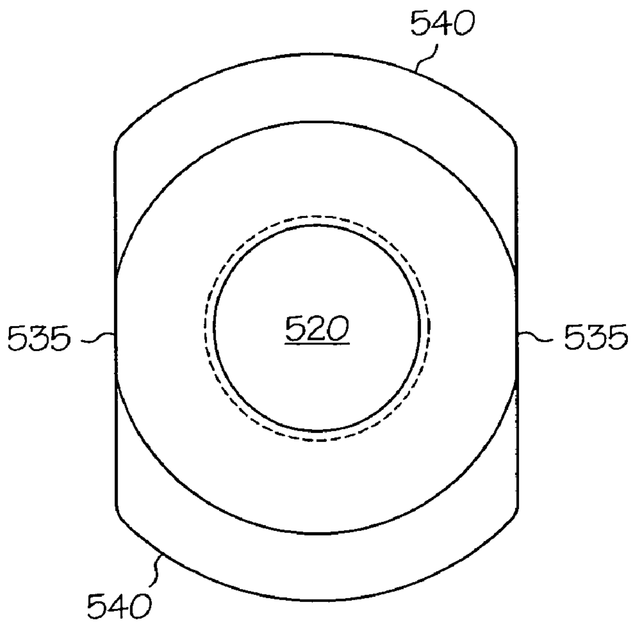
FIG. 12 is a top view of the adapter of FIG. 11.
Figure 13:
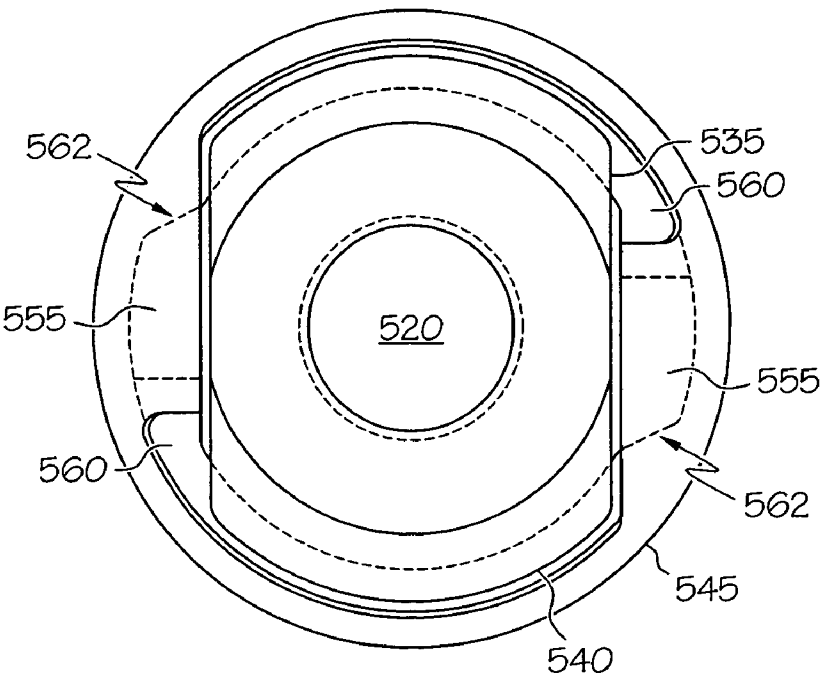
FIG. 13 is a top view of the assembled connection of FIG. 11 before rotation (without the filter).
Figure 14:
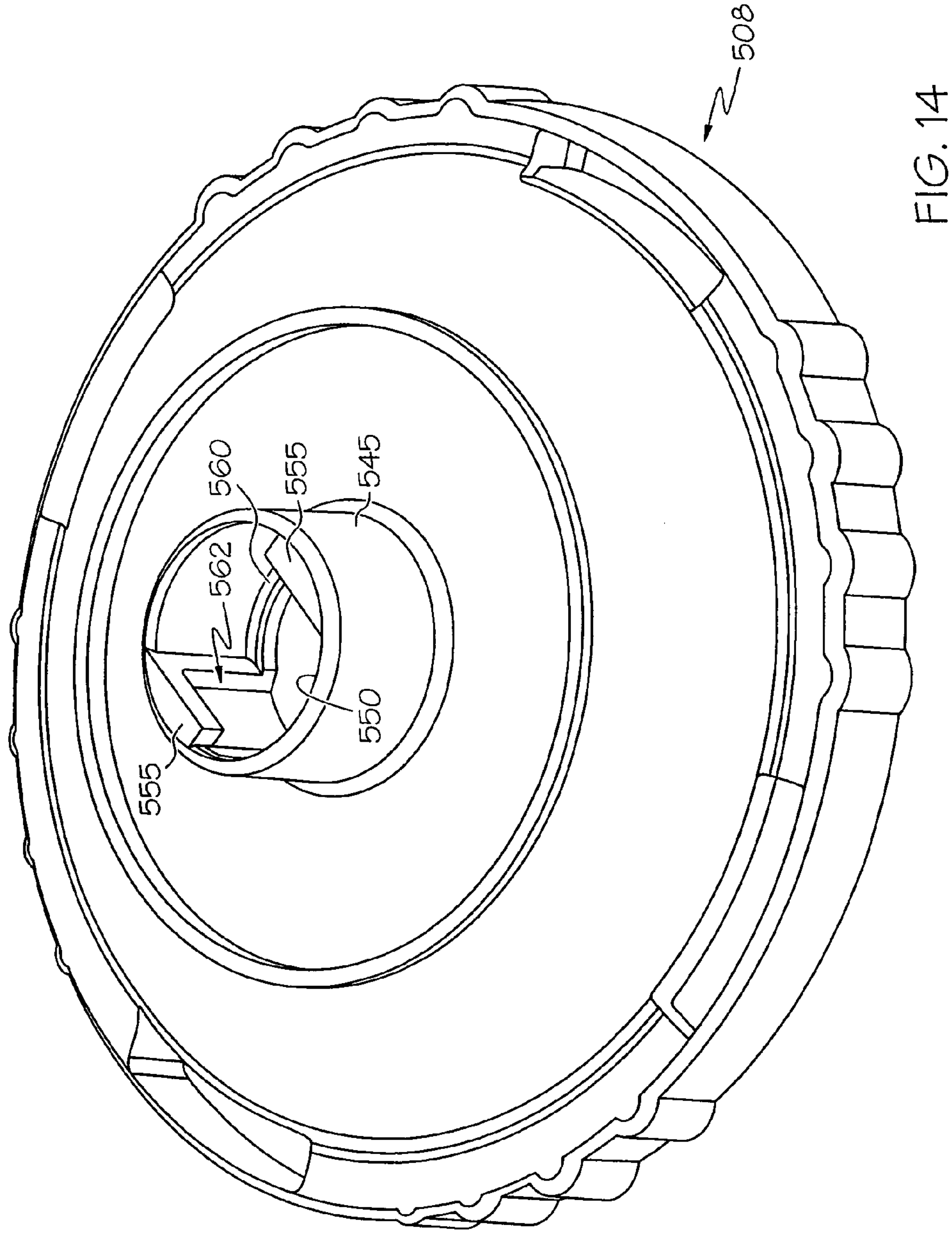
FIG. 14 is a perspective view of reusable outer lid.

In FIGS. 8–10, the disposable cup 450 has a generally elliptical lower side wall portion 455, and intermediate side wall portion 460 extending from the lower side wall portion to the generally cylindrical upper side wall portion 465.

The outlet end 470 at the top of the disposable cup 450 is open, and the bottom 475 is closed. The lower side wall portion 455, intermediate side wall portion 460, and upper side wall portion 465, outlet end 470, and bottom 475 define an interior 480. The interior 480 is smaller than the interior 75. The elliptical shape makes it easier to read the indicia for measuring paint because the disposable cup extends close to the reusable cup holder. The longer axis of the ellipse can extend all or substantially all the way across the diameter of the reusable cup holder, or something less than all or substantially all the way across the diameter.

The outlet end 470 defines an axis 485. There is a flange 490 extending outward and downward from the edge of the outlet end 470. The flange 490 extends downward at an angle αa in a range of from about 10° to about 70° from the axis 485 of the outlet end 470. The outlet end 470 is adapted to be placed into the reusable cup holder, so it sized to fit in the reusable cup holder.

In these embodiments, the distance across the outlet end of the disposable cup is greater than the distance across the bottom in at least one direction. The smaller portion of the disposable cup can extend the entire height of the side wall or less than the entire height of the side wall. If the side wall is cylindrical, and the smaller diameter portion extends the entire height of the sidewall, it can be connected to the flange by a flat annular portion. If it does not extend the entire height of the side wall, it can be can be connected by a generally frustoconical upper side wall portion. Other side wall arrangements are possible, as are well known to those of skill in the art.

This embodiment of the disposable cup can be used with the reusable cup holder and outer lid and disposable lid without any modification to the assembly, allowing different sizes of disposable cups to be used in the fluid supply assembly.

The fluid supply assembly has been shown and described with the disposable cup and reusable cup holder being generally cylindrical, which is a typical shape because of ease of manufacture and use. However, it could be made in other shapes, including, but not limited to, square, triangular, pentagonal, elliptical, etc.

While certain representative embodiments and details have been shown for purposes of illustrating the invention, it will be apparent to those skilled in the art that various changes in the compositions and methods disclosed herein may be made without departing from the scope of the invention, which is defined in the appended claims.

What is claimed is:

1. An adapter assembly for connecting a fluid supply assembly to a fluid applicator comprising:

an outer lid for the fluid supply assembly, the outer lid having an integral generally cylindrical fitting with an opening therethrough, the fitting having a tab at an upper end and a horizontal stop at a lower end; and an adapter having a first end and a second end, and a bore between the first end and the second end, the first end having a connecting surface adapted to mate with a complementary connecting surface on the fluid applicator, the second end having a portion having a first shape and a portion having a second shape, the portion having the first shape being adapted to pass by the tab so that the second end can be inserted into the fitting, and the portion having the second shape being adapted so that it cannot pass by the tab, the second end having a height so that the second end fits between the horizontal stop and the tab of the fitting, whereby when the adapter is rotated, the portion having the second shape is retained under the tab so that the adapter is locked to the outer lid.

2. The adapter assembly of claim 1 wherein the portion having the first shape is flat, and the portion having the second shape is curved.

3. The adapter assembly of claim 2 wherein there are two opposing flat portions and two opposing curved portions.

4. The adapter assembly of claim 1 wherein the first end is generally cylindrical.

5. The adapter assembly of claim 4 wherein the portion having the second shape is curved and wherein a diameter of the first end is smaller than a diameter of the curved portion of the second end.

6. The adapter assembly of claim 1 wherein there are at least two portions having the first shape.

7. The adapter assembly of claim 1 wherein there are at least two portions having the second shape.

8. The adapter assembly of claim 1 wherein the connecting surface and complementary connecting surface are selected from threads, lugs and grooves, tapered connections, bayonet connections, or snap connections.

9. The adapter assembly of claim 1 further comprising a disposable lid having an integral generally cylindrical fitting with an opening therethrough, the fitting of the disposable lid adapted to fit inside the bore of the adapter when the adapter is locked to the outer lid, the opening of the disposable lid being in fluid communication with the bore of the adapter.

10. The adapter assembly of claim 1 wherein the adapter is made of metal.

11. The adapter assembly of claim 1 wherein the outer lid is made of plastic.

12. The adapter assembly of claim 1 wherein the fitting is generally cylindrical.

13. The adapter assembly of claim 1 further comprising a filter placed in the bore of the adapter.

14. The adapter assembly of claim 1 wherein the fitting has a vertical stop in the opening.

15. The adapter assembly of claim 14 wherein the vertical stop extends from the tab to the horizontal stop.

16. An adapter assembly for connecting a fluid supply assembly to a fluid applicator comprising:

an outer lid for the fluid supply assembly, the outer lid having an integral generally cylindrical fitting with an opening therethrough, the fitting having a tab at an upper end and a horizontal stop at a lower end;

an adapter having a first end and a second end, and a bore between the first end and the second end, the first end having a connecting surface adapted to mate with a complementary connecting surface on the fluid applicator, the second end having a flat portion and a curved portion, the flat portion being adapted to pass by the tab so that the second end can be inserted into the fitting, and the curved portion being adapted so that it cannot pass by the tab, the second end having a height so that the second end fits between the horizontal stop and the tab of the fitting, whereby when the adapter is rotated, the curved portion is retained under the tab so that the adapter is locked to the outer lid; and a disposable lid having an integral generally cylindrical fitting with an opening therethrough, the fitting of the disposable lid adapted to fit inside the bore of the adapter when the adapter is locked to the outer lid, the opening of the disposable lid being in fluid communication with the bore of the adapter.

17. The adapter assembly of claim 16 wherein the first end is generally cylindrical.

18. The adapter assembly of claim 16 wherein a diameter of the first end is smaller than a diameter of the curved portion of the second end.

19. The adapter assembly of claim 16 wherein there are two opposing flat portions and two opposing curved portions.

20. The adapter assembly of claim 16 wherein the connecting surface and complementary connecting surface are selected from threads, lugs and grooves, tapered connections, bayonet connections, or snap connections.

21. The adapter assembly of claim 16 wherein the fitting of the outer lid and the fitting of the disposable lid are generally cylindrical.

22. The adapter assembly of claim 16 wherein the fitting has a vertical stop in the opening.

23. The adapter assembly of claim 22 wherein the vertical stop extends from the tab to the horizontal stop.

24. A method of connecting a fluid supply assembly to a fluid applicator comprising:

providing an outer lid for the fluid supply assembly, the outer lid having an integral generally cylindrical fitting with an opening therethrough, the fitting having a tab at an upper end and a horizontal stop at a lower end;

providing an adapter having a first end and a second end, and a bore between the first end and the second end, the first end having a connecting surface adapted to mate with a complementary connecting surface on the fluid applicator, the second end having a portion having a first shape and a portion having a second shape, the portion having the first shape being adapted to pass by the tab and the portion having the second shape being adapted so that it cannot pass by the tab, the second end having a height so that the second end fits between the horizontal stop and the tab of the fitting;

connecting the first end of the adapter to the fluid applicator;

matching the portion having the first shape with the tab of the fitting and inserting the second end of the adapter into the fitting in the outer lid until the second end reaches the horizontal stop; and rotating the second end of the adapter in the fitting so that the portion having the second shape is retained under the tab thereby locking the adapter to the outer lid.

25. The method of claim 24 further comprising:

providing a disposable lid having an integral generally cylindrical fitting with an opening therethrough; and inserting the fitting of the disposable lid into the bore of the adapter.

26. The method of claim 24 wherein the fitting has a vertical stop in the opening, and wherein the second end of the adapter is rotated until it engages the vertical stop.

* * * * *